(12) United States Patent
Small

(10) Patent No.: US 8,192,119 B1
(45) Date of Patent: Jun. 5, 2012

(54) TRAILER CARGO STRAP ROLLING DEVICE

(76) Inventor: Stacy L. Small, Muscatine, IA (US)

( * ) Notice: Subject to any disclaimer, the term of this patent is extended or adjusted under 35 U.S.C. 154(b) by 80 days.

(21) Appl. No.: 12/880,398

(22) Filed: Sep. 13, 2010

(51) Int. Cl.
*B60P 7/00* (2006.01)

(52) U.S. Cl. ........................................ 410/103

(58) Field of Classification Search .................. 410/96, 410/97, 100, 103, 156, 12; 254/323; 242/395, 242/129.3, 532.6; 24/265 CD, 68 CD
See application file for complete search history.

(56) References Cited

U.S. PATENT DOCUMENTS

| | | | |
|---|---|---|---|
| 5,993,127 A * | 11/1999 | Shinn | 410/100 |
| 6,139,233 A | 10/2000 | Wilsey | |
| 6,179,534 B1 * | 1/2001 | Weckter | 410/103 |
| 6,467,755 B2 | 10/2002 | Reilly et al. | |
| 7,278,808 B1 | 10/2007 | Sisk, Sr. et al. | |
| 7,357,612 B1 | 4/2008 | Paul | |
| 7,410,336 B2 | 8/2008 | Parks | |

* cited by examiner

*Primary Examiner* — Stephen Gordon

(57) ABSTRACT

A trailer cargo strap rolling device for conestoga-style and flatbed trailers including a base that fits into a trailer stake pocket, an adjustable post member secured into a selected height with a lock pin, and a winder assembly operated either manually or with a wireless drill with two prongs around which a trailer strap can be wound.

6 Claims, 5 Drawing Sheets

TRAILER CARGO STRAP ROLLING DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of cargo strap winding devices are known in the prior art. However, the previous devices either break or require that the user throw a hook over the trailer before winding up the cargo strap, which is a dangerous task. However, what is needed is trailer cargo strap rolling device for conestoga-style and flatbed trailers, the device including a base that fits into a trailer stake pocket, an inner post member secured into an outer post member with a lock pin, and a winder assembly operated including a sleeve through which a threaded end of a crank handle member is secured and a roller grip member having a receiver end rotatingly attached to the threaded end of the crank handle member and also having a tubular U-shaped support member around which a cargo strap is wound. The crank handle member may be turned either manually or with a wireless drill.

FIELD OF THE INVENTION

The present invention relates to cargo strap winding devices, and more particularly, to a trailer cargo strap rolling device for conestoga-style and flatbed trailers.

SUMMARY OF THE INVENTION

The general purpose of the present trailer cargo strap rolling device, described subsequently in greater detail, is to provide a trailer cargo strap rolling device which has many novel features that result in a trailer cargo strap rolling device which is not anticipated, rendered obvious, suggested, or even implied by prior art, either alone or in combination thereof.

To accomplish this, the present trailer cargo strap rolling device is designed for conestoga-style and flatbed trailers and provides a base that fits into a trailer stake pocket, an inner post member secured into an outer post member with a lock pin, and a winder assembly operated including a sleeve through which a threaded end of a crank handle member is secured and a roller grip member having a receiver end rotatingly attached to the threaded end of the crank handle member and also having a tubular U-shaped support member around which a cargo strap is wound. The crank handle member may be turned either manually or with a wireless drill.

The present trailer cargo strap rolling device is disassembled for storage within the stake pockets of a trailer. The device is winds up both 2-inch and 4-inch wide cargo straps.

The present device improves leverage and torque as compared to manually rolling up a cargo strap or to using other tools. The present device rolls up a cargo strap much easier and more quickly than manually rolling up the cargo strap. If a user trades trailers, the user may purchase a stake pocket and install it into the user's new trailer. The present device save a truck driver significant time and effort when rolling up a cargo strap, especially considering that several cargo straps may need to be rewound for any given load, and reduces unnecessary body strain, reduces fatigue, and further reduces cuts on the driver's hands and keeps the driver's hands clean as compared to using other cargo strap rolling devices. The present device is easily used and convenient. Because the device can be used to quickly roll up a cargo strap, the user's time spent in unpleasant weather conditions, such as rain and cold, is reduced.

Thus has been broadly outlined the more important features of the present trailer cargo strap rolling device and method so that the detailed description thereof that follows may be better understood and in order that the present contribution to the art may be better appreciated.

Numerous objects, features and advantages of the present trailer strap rolling device will be readily apparent to those of ordinary skill in the art upon reading the following detailed description of presently preferred, but nonetheless illustrative, examples of the present trailer cargo strap rolling device and method when taken in conjunction with the accompanying drawings. In this respect, before explaining the current examples of the present trailer cargo strap rolling device and method in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the trailer cargo strap rolling device and method. It is therefore important that the claims be regarded as including such equivalent constructions insofar as they do not depart from the spirit and scope of the present invention.

Objects of the present trailer cargo strap rolling device and method, along with various novel features that characterize the invention are particularly pointed out in the claims forming a part of this disclosure. For better understanding of the trailer strap rolling device and method, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
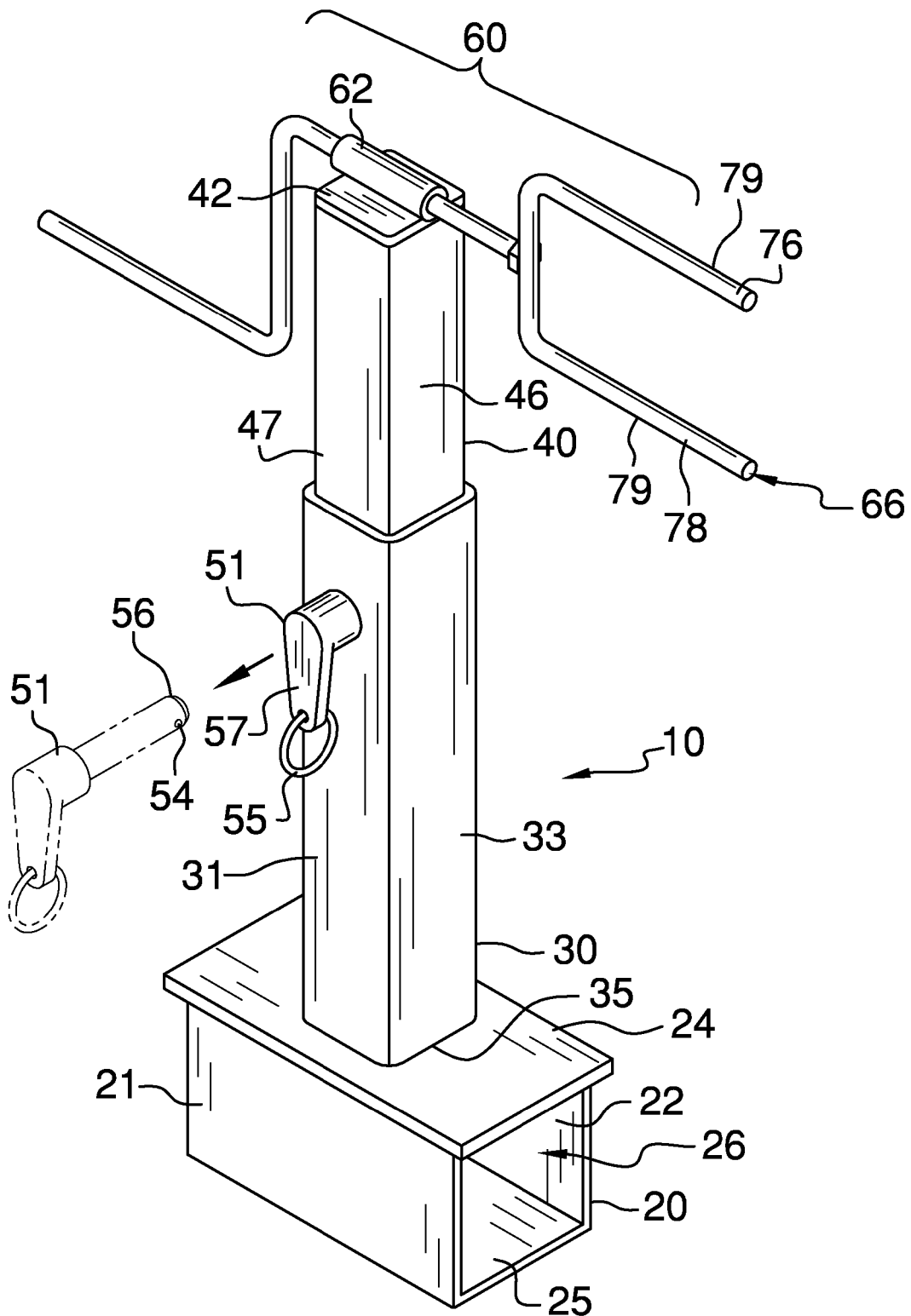
FIG. 1 is a perspective view.
Figure 2:
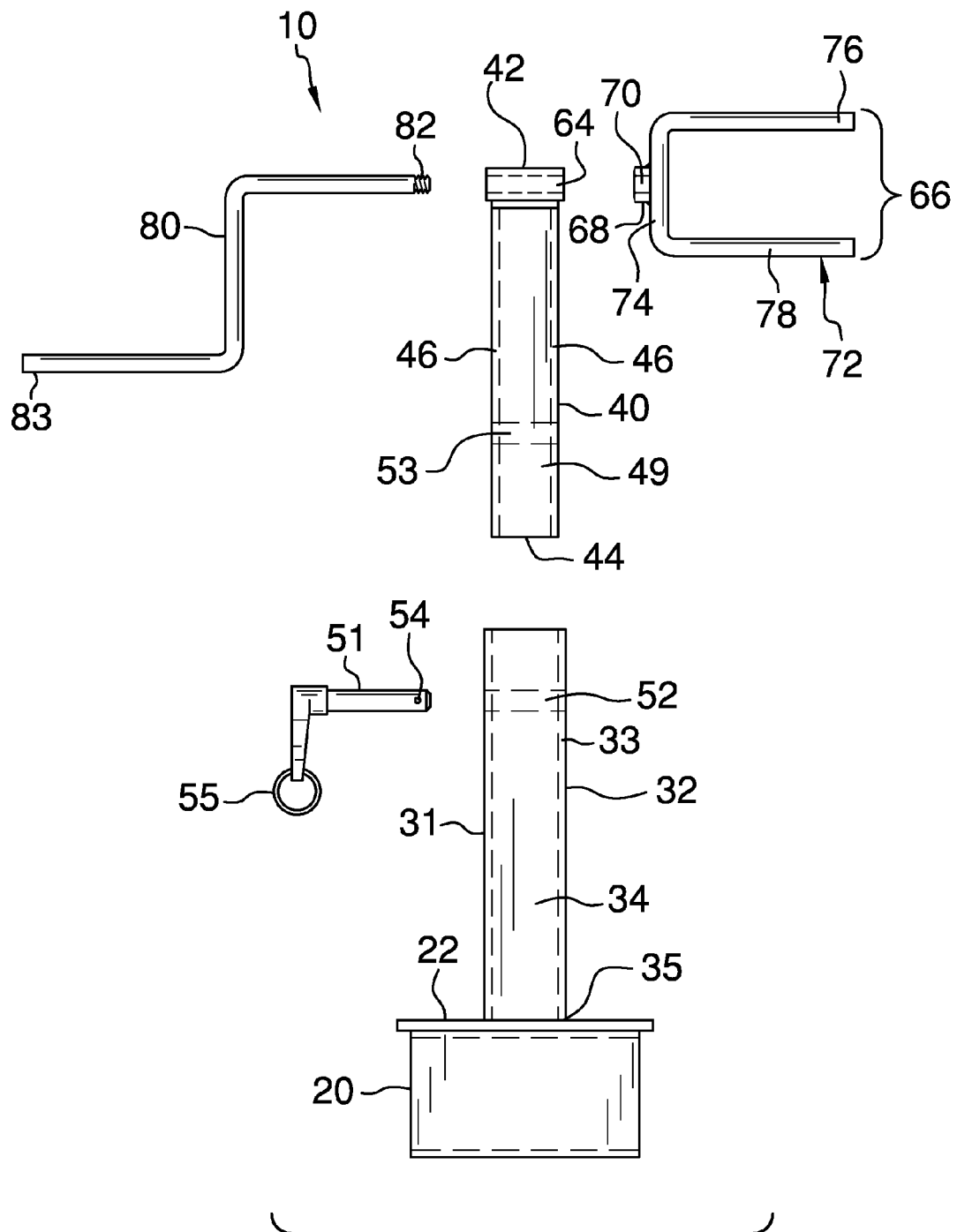
FIG. 2 is an exploded front elevation view.
Figure 3:
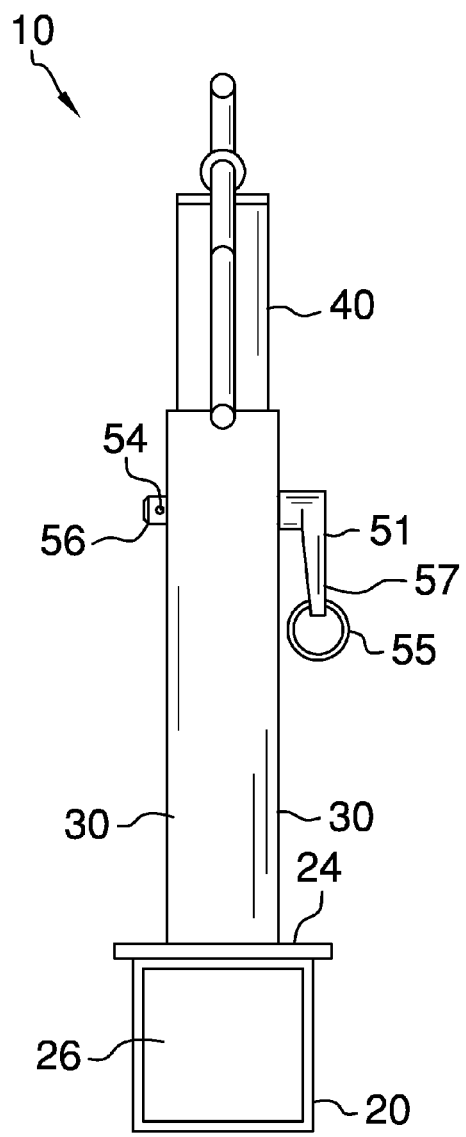
FIG. 3 is an assembled right elevation view.
Figure 4:
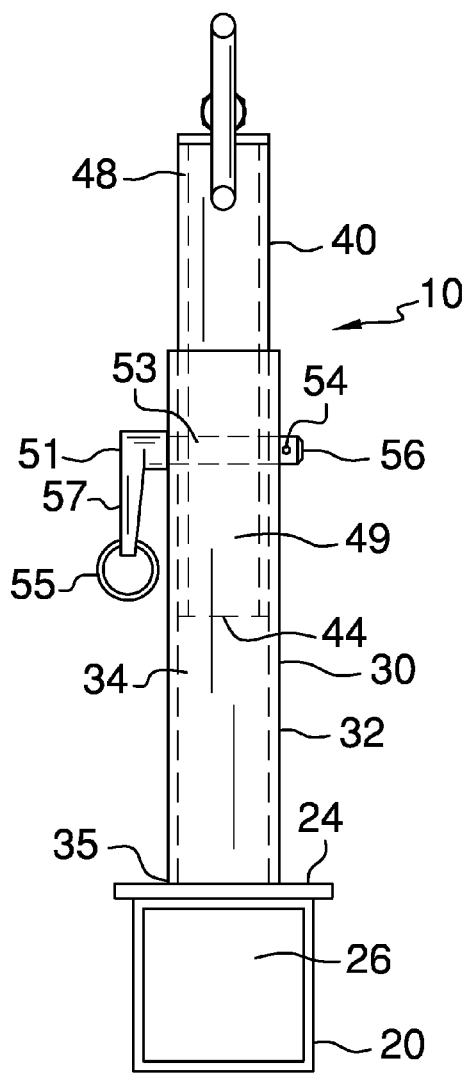
FIG. 4 is an assembled left elevation view.
Figure 5:
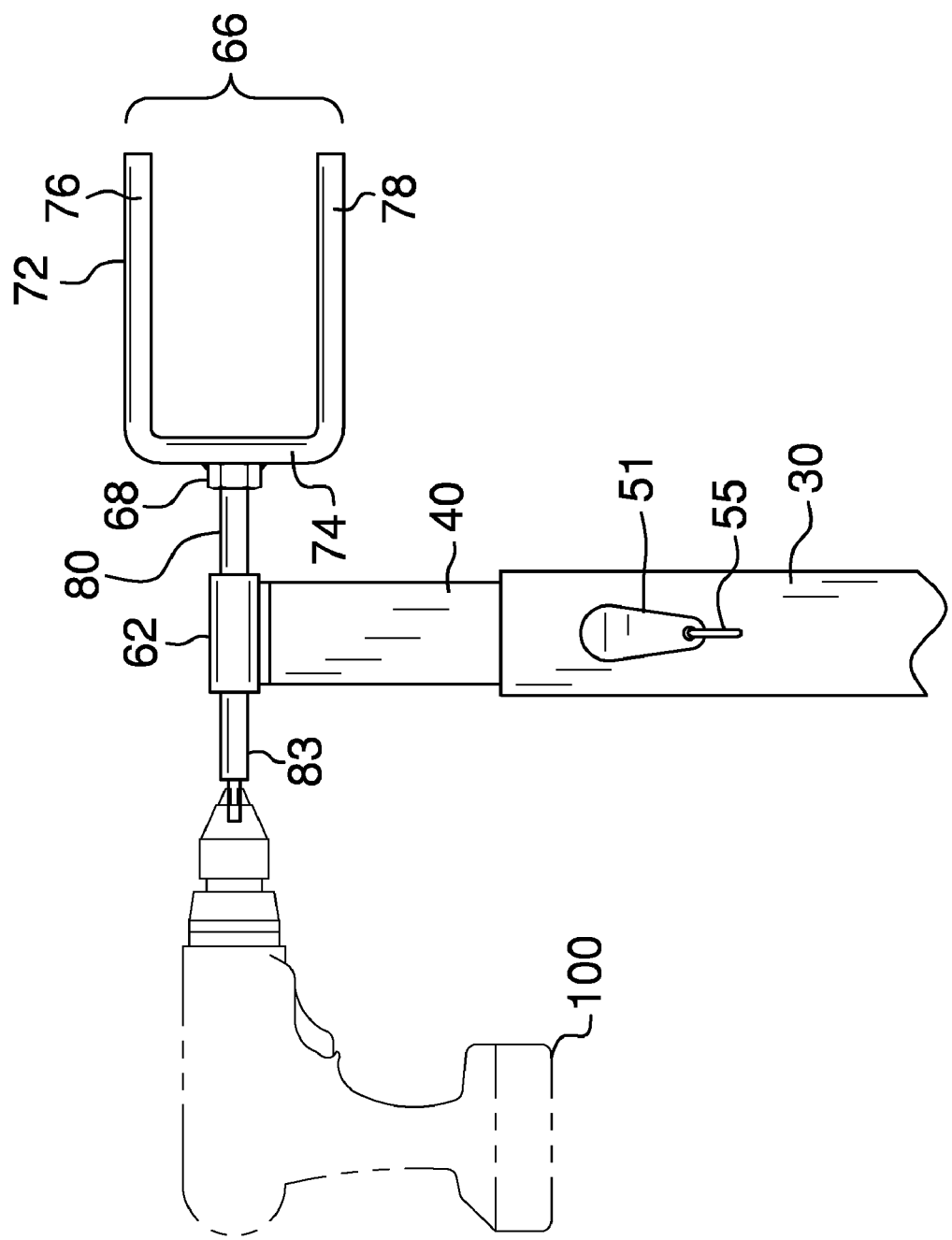
FIG. 5 is a front elevation view illustrating a drill attached to a winder assembly.
Figure 6:
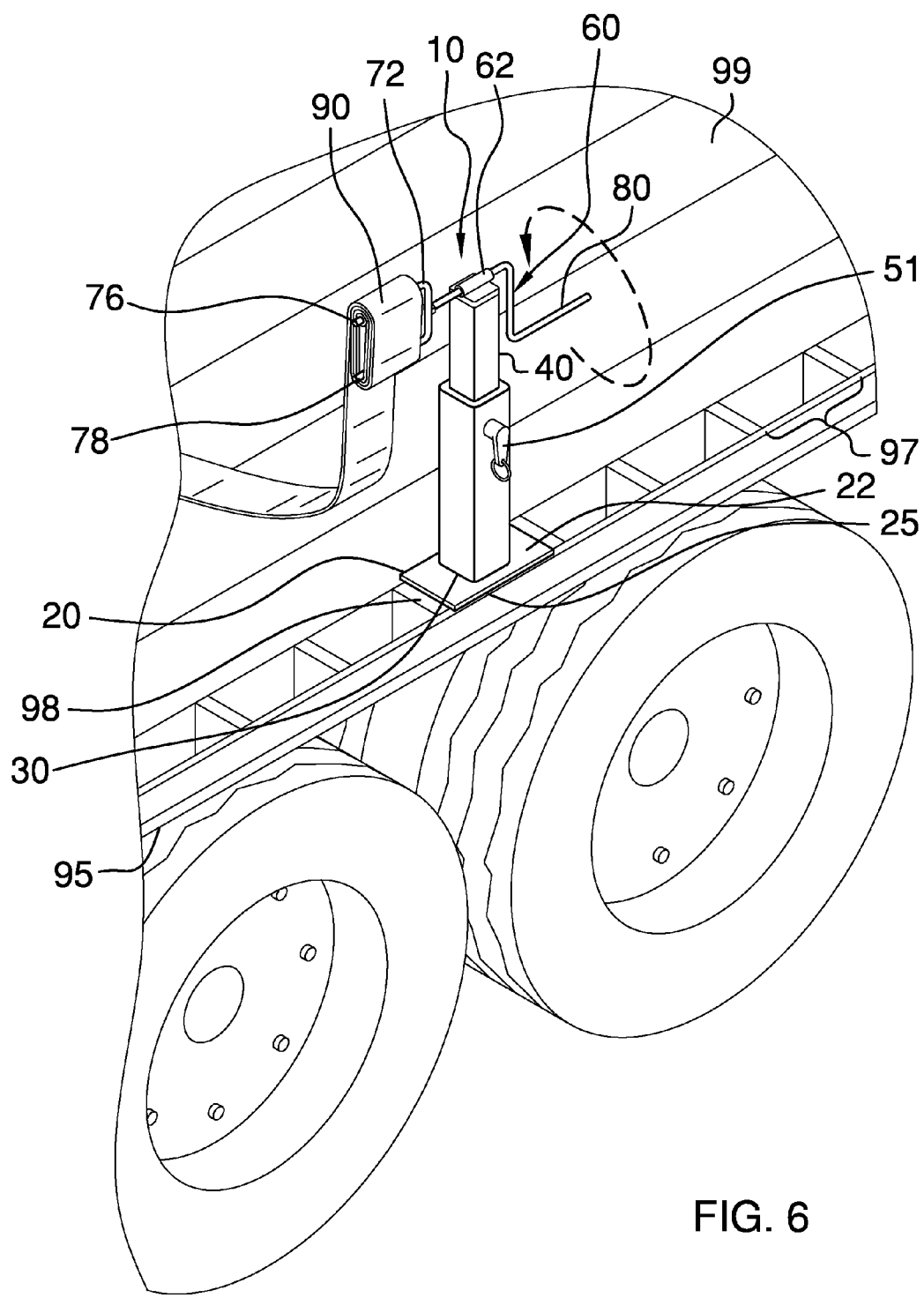
FIG. 6 is an in-use perspective view of a base secured within a stake pocket.

With reference now to the drawings, and in particular FIGS. 1 through 6 thereof, example of the instant trailer cargo strap rolling device employing the principles and concepts of the present trailer cargo strap rolling device and generally designated by the reference number 10 will be described.

Referring to FIGS. 1 through 6, the present trailer strap rolling device 10 is illustrated. The trailer cargo strap rolling device 10 is used in combination with a trailer 95, such as a conestoga-style or a flatbed trailer, having a cargo strap 90 and at least one stake pocket 97 disposed on the bed 99 of the trailer 95.

The present trailer cargo strap rolling device 10 includes a hollow parallelepiped base 20, a hollow parallelepiped outer post member 30, a hollow parallelepiped inner post member 40, and a winder assembly 60. The base 20 includes a front wall 21, a rear wall 22, a top wall 24, a bottom wall 25, an internal first cavity 26 defined by the front wall 21, the rear wall 22, the top wall 24, and the bottom wall 25. The outer post member 30 includes a front side 31, a rear side 32, a pair of opposing side members 33, a lower wall 35, and a second cavity 34 defined by the front side 31, the rear side 32, and the side members 33. Each side member 33 is disposed between the front side 31 and the rear side 32. The lower wall 35 of the outer post member 30 is attached to the base 20 top wall 24.

The inner post member 40 includes an upper edge 42, a lower edge 44, a front edge 47, a rear edge 48, a pair of opposing side edges 46, each side edge disposed between the front edge 47 and the rear edge 48. The inner post member 40 also includes a third cavity 49 defined by the upper edge 42, the lower edge 44, the front edge 47, the rear edge 48, and the side edges 46. The outer post member 30 second cavity 34 slidably, removably receives the inner post member 40 therein. A second channel 53 of the inner post member 40 aligns with a first channel 52 of the outer post member 30.

An L-shaped lock pin 51 has a pressure-release protrusion 54 disposed on a first end 56 thereof and a ring 55 disposed on an opposite second end 57. The lock pin 51 slidably engages the first channel 52 and the second channel 53 to secure the inner post member 40 within the outer post member 30.

The winder assembly 60 includes a cylindrical sleeve 62 attached to the upper edge 42 of the inner post member 40 as well as a third channel 64 disposed within the sleeve 62 along a horizontal midline of the sleeve 62. The winder assembly 60 also includes a roller grip member 66. The roller grip member 66 includes a cylindrical receiver end 68 having an aperture 70 therethough along a horizontal center line of the receiver end 68 and a tubular U-shaped support member 72 having a center section 74 disposed perpendicular to the receiver end 68. In addition, the roller grip member 66 includes a tubular reverse Z-shaped crank handle member 80 having a threaded proximal end 82. The proximal end 82 operationally engages the receiver end 68, while the sleeve 62 supportingly receives the proximal end 82 therethrough. The roller grip member 66 rotatingly engages the support member 72. The reverse Z-shape of the crank handle member 80 makes the crank handle easier to turn by providing increased torque and leverage as compared to either manually rolling up a cargo strap or using a device which does not provide the same configuration.

The support member 72 also has a first portion 76 and a second portion 78 on opposite sides of the center section 74. The support member 72 has sufficient structural integrity to support the weight of a cargo strap 90 and is sized to support a cargo strap 90 wound thereabout. A cargo strap 90 is removably disposed around an outer side 79 of the first portion 76 and the second portion 78. To use the present device 10, the base 20 is removably disposed within a stake pocket 97 of a trailer 95. The bottom wall 25 of the base 20 removably adjoins a top edge 98 on each side of the stake pocket 97.

The crank handle member 80 can be manually rotated or electrically operated by an electric drill, including a wireless drill, which operationally engages a distal end 83 of the crank handle member 80.

With respect to the above description then, it is to be realized that the optimum dimensional relationships for the parts of the present trailer cargo strap rolling device to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A trailer cargo strap rolling device comprising:
   a hollow parallelepiped base comprising:
      a front wall;
      a rear wall,
      a top wall;
      a bottom wall;
      an internal first cavity defined by the front wall, the rear wall, the top wall, and the bottom wall;
   a hollow parallelepiped outer post member comprising:
      a front side;
      a rear side;
      a pair of opposing side members, each side member disposed between the front side and the rear side;
      a lower wall;
      a second cavity defined by the front side, the rear side, and the side members, wherein the lower wall of the outer post member is attached to the base top wall;
   a hollow parallelepiped inner post member comprising:
      an upper edge;
      a lower edge;
      a front edge;
      a rear edge;
      a pair of opposing side edges, each side edge disposed between the front edge and the rear edge;
      a third cavity defined by the upper edge, the lower edge, the front edge, the rear edge and the side edges;
   wherein the outer post member second cavity slidably, removably receives the inner post member therein;
   wherein a second channel of the inner post member aligns with a first channel of the outer post member;
   an L-shaped lock pin having a pressure-release protrusion disposed on a first end thereof and a ring disposed on an opposite second end, wherein the lock pin slidably engages the first channel and the second channel, and further wherein the lock pin protrusion secures the inner post member within the outer post member;
   a winder assembly comprising:

a cylindrical sleeve attached to the upper edge of the inner post member;

a third channel disposed within the sleeve along a horizontal midline of the sleeve;

a roller grip member comprising:
- a cylindrical receiver end having an aperture therethough along a horizontal center line of the receiver end;
- a tubular U-shaped support member having a center section disposed perpendicular to the receiver end;

a tubular reverse Z-shaped crank handle member having a threaded proximal end, the proximal end operationally engaging the receiver end, wherein the sleeve supportingly receives the proximal end therethrough; and further wherein the roller grip member rotatingly engages the support member.

2. The trailer cargo strap rolling device of claim 1 wherein the support member comprises:

a first portion and a second portion on opposite sides of the center section;

wherein a cargo strap is removably disposed around an outer side of each of the first portion and the second portion.

3. The trailer cargo strap rolling device of claim 2 wherein the base is removably disposed within a stake pocket of a trailer.

4. The trailer cargo strap rolling device of claim 3 wherein the bottom wall of the base removably adjoins a top edge on sides of the stake pocket.

5. The trailer cargo strap rolling device of claim 4 wherein the crank handle member is manually rotated.

6. The trailer cargo strap rolling device of claim 4 wherein an electric drill operationally engages a distal end of the crank handle member.

* * * * *